(12) United States Patent
Sachdev et al.

(10) Patent No.: US 11,257,499 B2
(45) Date of Patent: Feb. 22, 2022

(54) PROMISE MANAGEMENT APPARATUS AND METHOD

(71) Applicant: UNIPHORE SOFTWARE SYSTEMS, INC., Palo Alto, CA (US)

(72) Inventors: Umesh Sachdev, Fremont, CA (US); Samith Ramachandran, Palo Alto, CA (US)

(73) Assignee: UNIPHORE TECHNOLOGIES INC., Palo Alto, CA (US)

( * ) Notice: Subject to any disclaimer, the term of this patent is extended or adjusted under 35 U.S.C. 154(b) by 38 days.

(21) Appl. No.: 16/663,361

(22) Filed: Oct. 25, 2019

(65) Prior Publication Data

US 2020/0251116 A1    Aug. 6, 2020

(30) Foreign Application Priority Data

Feb. 1, 2019   (IN) .............................. 201941004137

(51) Int. Cl.
*G10L 15/26*   (2006.01)
*H04M 3/51*   (2006.01)
*H04M 3/22*   (2006.01)

(52) U.S. Cl.
CPC ........... *G10L 15/26* (2013.01); *H04M 3/2218* (2013.01); *H04M 3/5175* (2013.01); *H04M 3/5183* (2013.01)

(58) Field of Classification Search
USPC ....................................................... 704/270.1
See application file for complete search history.

(56) References Cited

U.S. PATENT DOCUMENTS

| | | | | |
|---|---|---|---|---|
| 2003/0195894 | A1* | 10/2003 | Powers | H04M 3/5183 |
| 2006/0074623 | A1* | 4/2006 | Tankhiwale | H04L 65/604 |
| | | | | 704/1 |
| 2014/0314225 | A1* | 10/2014 | Riahi | H04L 51/02 |
| | | | | 379/265.09 |
| 2016/0335572 | A1* | 11/2016 | Bennett | G06Q 10/06311 |

* cited by examiner

*Primary Examiner* — Harry S Hong
(74) *Attorney, Agent, or Firm* — Praveer K Gupta

(57) ABSTRACT

Method for managing a promises management apparatus comprises automatically transcribing, using an automatic speech recognition engine, a call between a caller and an agent, based on real-time call stream of the call, wherein the caller calls the agent for resolution of a concern using the promises management apparatus. The method comprises automatically extracting, using a natural language processing engine, in real-time a promise made by the agent to the caller based on the transcript of the call, generating promises data by assigning an agent, a type, a timeline, an action, and a mode of execution to the promise, and storing the promises data in a datastore.

20 Claims, 5 Drawing Sheets

PROMISE MANAGEMENT APPARATUS AND METHOD

CROSS REFERENCE TO RELATED APPLICATIONS

This application claims priority to Indian Application No. 201941004137 filed on Feb. 1, 2019, which is incorporated herein by reference in its entirety.

FIELD OF INVENTION

The present invention relates generally to improving call center computing and management systems, and particularly to management of promises made during call between callers/customers and agents of the call center.

BACKGROUND OF INVENTION

Several businesses need to provide support to its customers, which is provided by a customer care call center. Customers place a call to the call center and customer service agents in the call center address and resolve customer issues/concerns. Computerized call management systems are customarily used to assist in logging the calls, and implementing resolution of customer issues. An agent (user of a computerized call management system) is required to capture the issues accurately and plan a resolution to the satisfaction of the customer. On numerous occasions the agent makes one or more promises to the customer during the call. Despite several advances, the state of the art lacks proper management of the promises made by the agents to the customers.

Therefore, there exists a need for improving the state of the art in management of promises made by an agent to a caller.

SUMMARY OF THE INVENTION

The present invention provides a method and an apparatus for management of promises, substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention relate to a method and an apparatus for promise management. A promise management apparatus comprises a call processing engine, which is implemented on one or more computers. The engine is configured to transcribe audio data from a call when the call is still active, and generate text data of the call in real-time, that is, as the parties on the call (i.e., a customer and an agent) speak. The audio of such speech is converted to text using automatic speech recognition (ASR) techniques. The engine applies language processing techniques to the text data to comprehend the text data, for example, to extract promises made during the call, in real time.

As used herein, the term "real time" means as soon as possible, unless indicated otherwise. For example, the audio data from the call is transcribed to text data, as soon as possible, including while the call is under progress. Similarly, language processing techniques are used to process the text as soon as possible, depending on as and when processable text becomes available, and the compliance is checked as soon as processed text becomes available.

Figure 1:
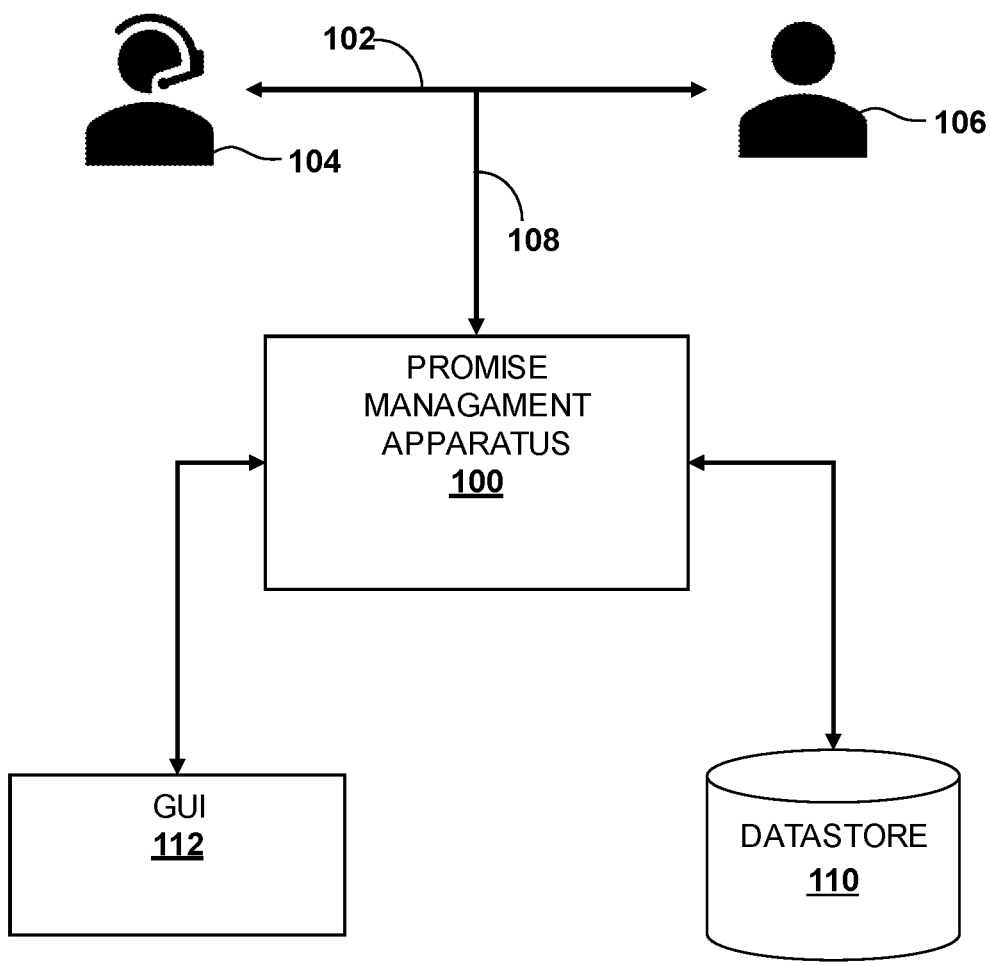
FIG. 1 is a schematic diagram depicting an environment for promise management, in accordance with an embodiment of the present invention.

FIG. 1 is a schematic diagram depicting an environment for promise management, in accordance with an embodiment of the present invention. The promise management apparatus 100 may be deployed in a call center. The apparatus 100 receives audio data 108 from a live call 102 between a caller 106 and an agent 104 of the call center. The caller 106 includes a customer calling the call center for resolution of a concern or issue or obtaining any information. The agent 104 includes an employee or worker of the call center responsible for handling calls of the customers of the call center or a business.

The apparatus 100 extracts one or more promises from the audio data 108. The apparatus 100 employs language processing techniques to extract promises from transcript of audio data 108. For example, the apparatus 100 may look for action words in the transcript to identify a promise. The action words may include but not limited to "will call back, "will update over SMS", "will update via email, and "will update via letter". The apparatus 100 may maintain a listing of action words that may be matched with the transcript in order to identify a promise. Once a promise is identified from the transcript, the apparatus 100 may associate identification information to the promise. Text data corresponding to the promise and associated identification information together constitute promises data. The apparatus 100 stores the promises data in a datastore 110. In an embodiment, the identification information associated with a promise includes an agent information, type of promise, a timeline for fulfilling the promise, an action needed to be taken to fulfil the promise, and a mode of execution of the promise.

In one embodiment, the apparatus 100 includes the datastore 110. In another embodiment, the datastore 110 is outside the apparatus 100 and is communicatively coupled to the apparatus 100. The apparatus 100 is also configured to retrieve promises data from the datastore 110 and display the promises data in a desired format at a graphical user interface (GUI) 112. In an embodiment, the GUI 112 is rendered on a display device, the display device being communicatively coupled to the apparatus 100.

Figure 2:
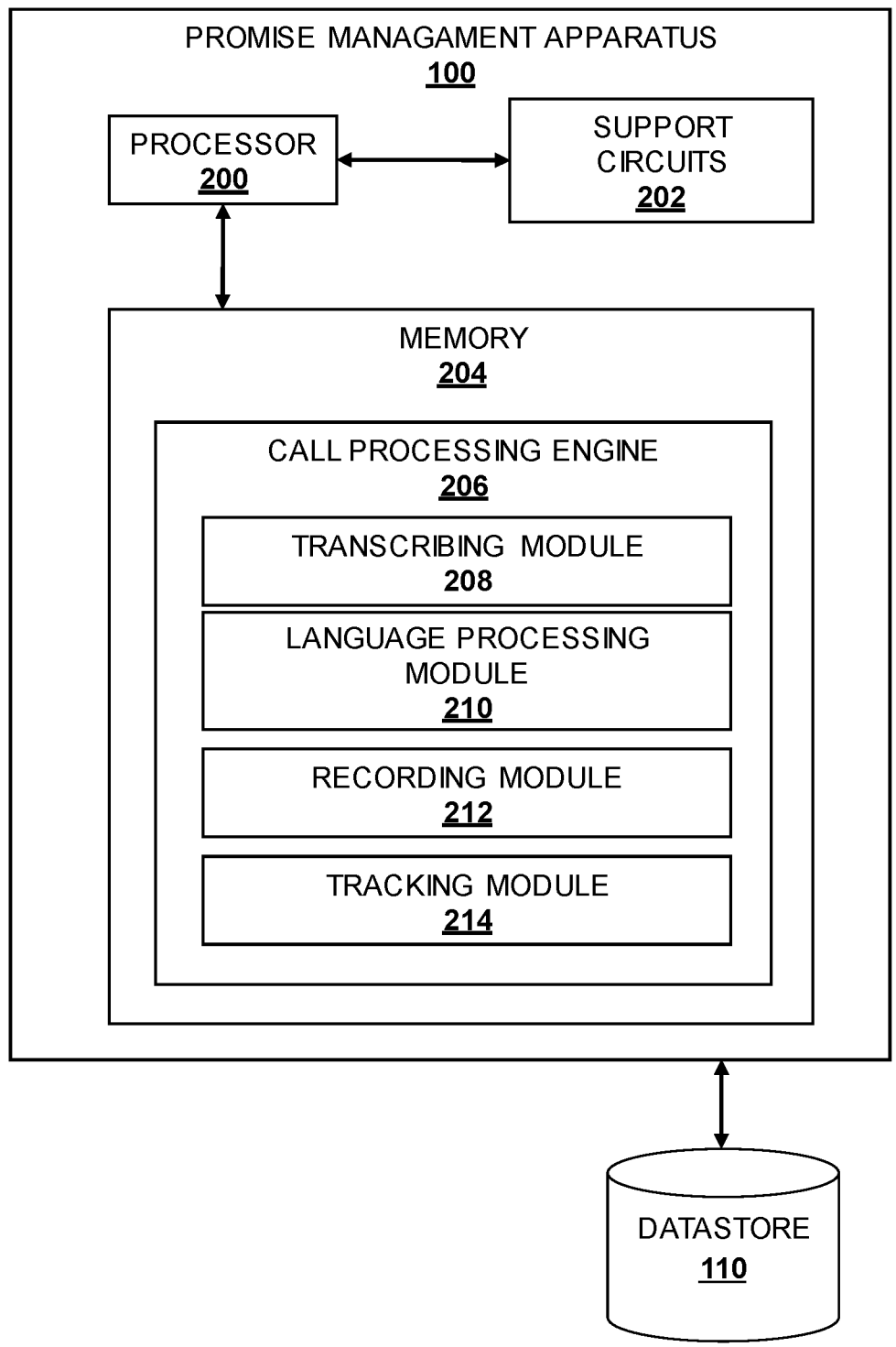
FIG. 2 is a block diagram of a promise management apparatus, in accordance with an embodiment of the present invention.

FIG. 2 discloses the promise management apparatus 100 in accordance with an embodiment of the present invention. The apparatus 100 includes a processor 200 communicatively coupled to support circuits 202 and a memory 204. The processor 200 may be any commercially available processor, microprocessor, microcontroller, and the like. The support circuits 202 comprise well-known circuits that provide functionality to the processor 200, such as, a user interface, clock circuits, network communications, cache, power supplies, I/O circuits, and the like. The memory 204 is any form of digital storage used for storing data and executable software. Such memory includes, but is not limited to, random access memory, read only memory, disk storage, optical storage, and the like.

The memory 204 includes computer readable instructions corresponding to an operating system (not shown) and a call processing engine 206. The call processing engine 206 is configured to extract audio data from the call 102. In an embodiment, the call processing engine 206 includes a transcribing module 208, a language processing module (LPM) 210, a recording module 212 and a tracking module 214. The modules 206-214 include computer executable instructions, which when executed by the processor 200, perform the task or function specific to each module.

The transcribing module 208 receives audio data 108 of the call 102 in real-time. The transcribing module 208 transcribes the audio data 108 to generate text data/transcript corresponding to the conversation between the caller 106 and the agent 104 who receives the call, in real-time. The transcription is performed using automatic speech recognition (ASR) techniques as generally known in the art and, for example, NUANCE® RECOGNIZERS/TRANSCRIBERS (NR/NTE), IBM® WATSON®, or GOOGLE® ASR engines.

The LPM 210 processes the text data using one or more language processing techniques, for example, natural language processing (NLP) as generally known in the art. The LPM 210 extracts one or more promises made during the call 102 by the agent 104 to the caller 106 from the text data. For example, the LPM 210 may look for action words in the transcript to identify a promise. The action words may include but not limited to "will call back, "will update over SMS", "will update via email, and "will update via letter". The apparatus LPM 210 may maintain a listing of action words that may be matched with the transcript in order to identify a promise.

Once a promise is identified from the transcript by the LPM 210, the recording module 212 may associate identification information to the promise. Text data corresponding to the promise and associated identification information together constitute promises data. The recording module 212 stores the promises data in the datastore 110. In an embodiment, the identification information associated with a promise includes an agent information, type of promise, a timeline for fulfilling the promise, an action needed to be taken to fulfil the promise, and a mode of execution of the promise. In an embodiment, the mode of execution of the promise includes a mode of communication employed to communicate with the caller 106, a rank of an agent 104 assigned to communicate with the caller 106, and a place of origin of the communication to the caller 106. The place of origin may include an address of facility from which a call is made by the agent 104 to the caller 106.

The tracking module 214 retrieves the promises data from the datastore 110 and displays the promises data at the GUI 112. The tracking module 214 uses the identification information associated with a promise to retrieve the promises data from the datastore 110. In an embodiment, the tracking module 214 sends one or more performance metrices of an agent 104 to a supervisor of the agent 104. In an embodiment, the tracking module 214 generates a report for a quality manager or a supervisor of the agent 104 based on promises data stored in the datastore 110 and may also send the report to the quality manager or the supervisor.

In an embodiment, the tracking module 214 displays in one or more fields of the GUI 112, a status for the day 302, a first call resolution (FCR) board, a list of one or more promises, and a status of the one or more promises. The 'status for a day' may include number of the calls that have occurred during the day, number of promises made during the day, and a mode of executing an action corresponding to each of the promises.

The FCR board comprises one or more performance metrices of the agent 104. The one or more performance metrices includes a customer satisfaction (CSAT) score, an FCR score, a repeat call score, and a customer churn score. The status of a promise includes an action taken towards fulfillment of a promise, a further action necessary to fulfil the promise, a timeline for taking of the further action, and identification of an agent assigned to take the further action.

Figure 3:
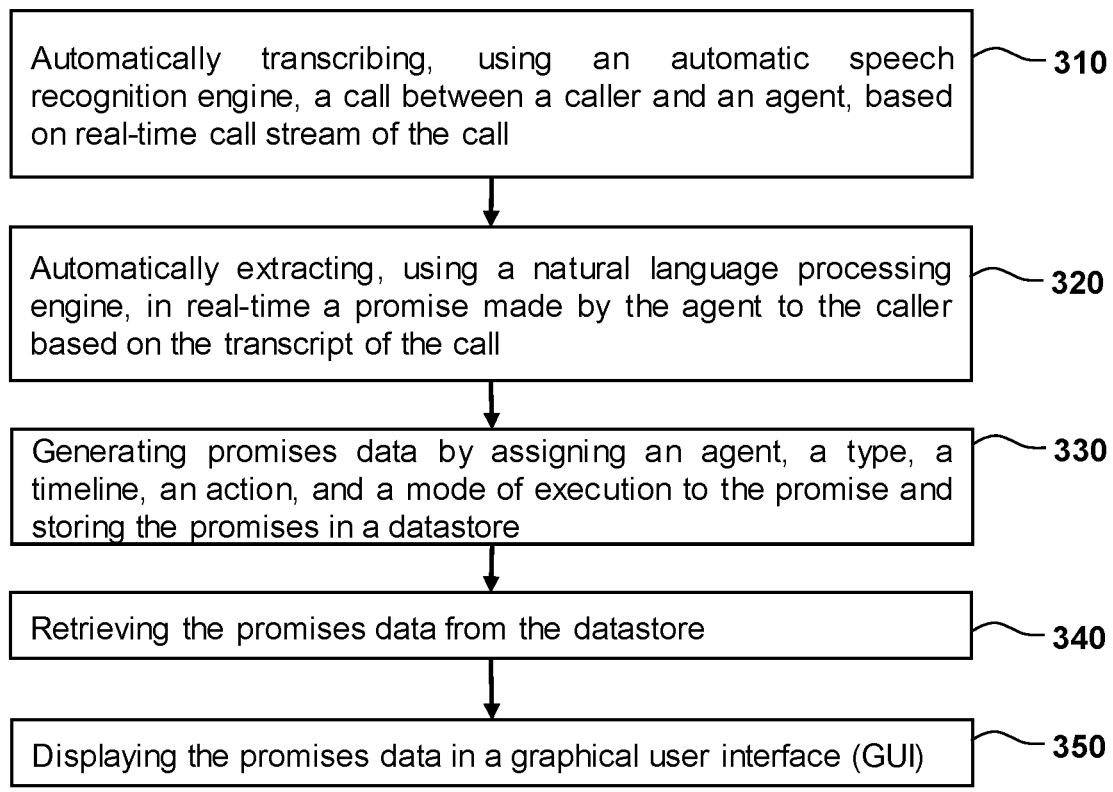
FIG. 3 is a flow diagram of a method of promise management, in accordance with an embodiment of the present invention.

FIG. 3 is a flow diagram of a method 300 for promise management performed by the apparatus 100, in accordance with an embodiment of the present invention.

The method 300 starts at step 310, at which the transcribing module 208 (including an automatic speech recognition engine) automatically transcribes a call between the agent and the caller based on real-time call stream of the call. The caller calls the agent for resolution of a concern using the promises management apparatus. The method 300 proceeds to step 320, at which the LPM 210 (a natural language processing engine) automatically extracts, in real-time, a promise made by the agent to the caller based on the transcript of the call. The method 300 proceeds to step 330, at which the recording module 212 generates promises data by assigning an agent, a type, a timeline, an action, and a mode of execution to the extracted promise and stores the promises data in the datastore 110. The method 300 proceeds to step 340, at which the tracking module 212 retrieves the promises data from the datastore 110. The method 300 ends at step 350, at which the tracking module 212 displays the promises data at the GUI 112.

Figure 4:
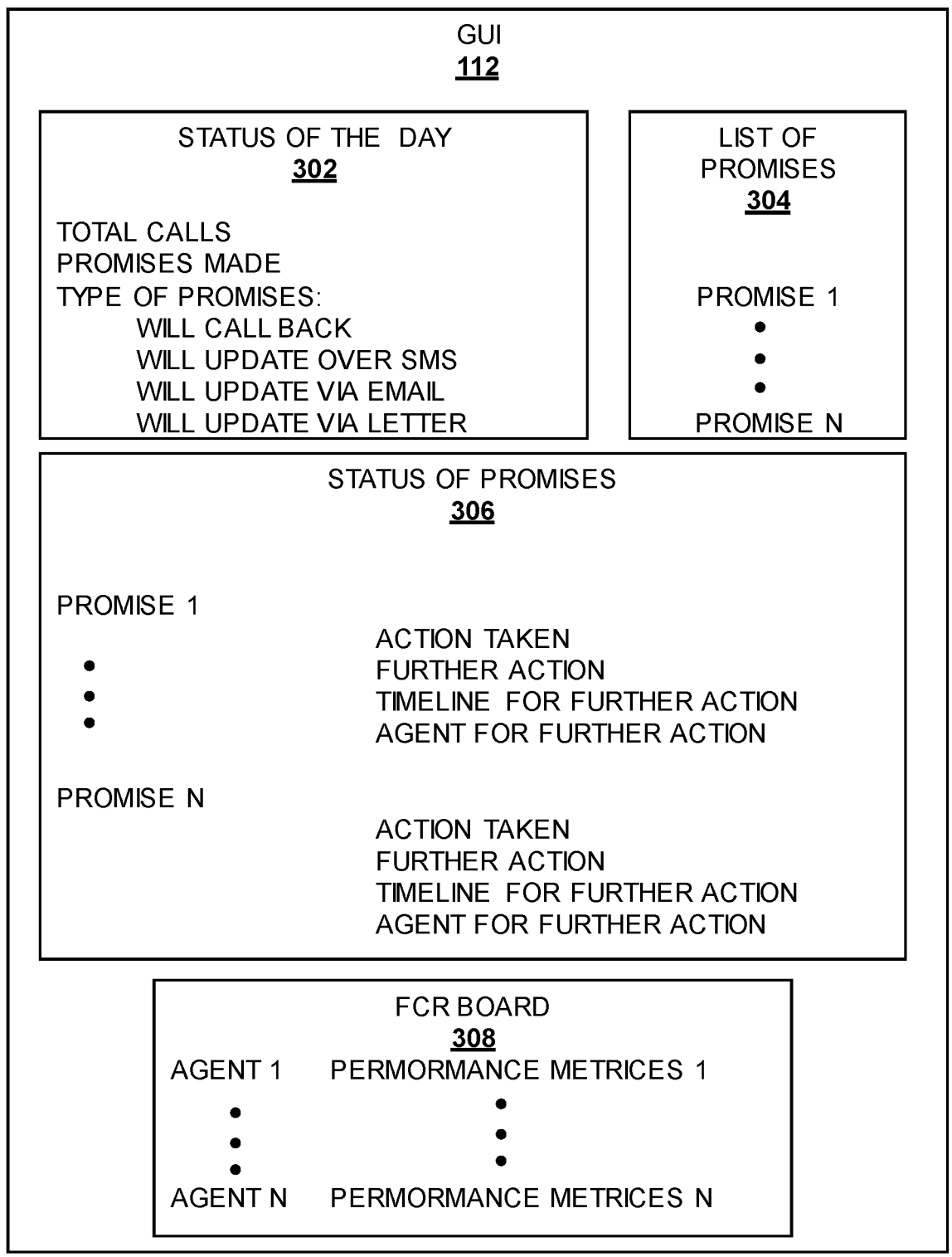
FIG. 4 depicts a graphical user interface (GUI) the promise management apparatus, in accordance with an embodiment of the present invention.

FIG. 4 is a portion of a GUI 112 presented to an agent by the promise management apparatus 100 and the method 300, in accordance with an embodiment of the present invention. The GUI 112 may display in one or more fields (areas or sections) status of the day 302, a list of promises 304, status of promises 306, and a first call resolution (FCR) board 308.

The status of the day 302 may include total number of calls that occurred between an agent and a caller, the promises made during that call, and type of promises. Type of promises include, "will call back", "will update over SMS", "will update via email" and/or "will update via letter".

List of promises 304 includes a numbered or sorted list of all the promises made during the day. In another embodiment, the list of promises 304 includes any one of a list of promises by an agent, a list of promises by all or some of agents of a department, a list of promises made to a particular category of callers or a list of all promises unfulfilled till date.

Status of promises 306 may include for each promise an action taken, a further action if required, a timeline for taking of further action, and an identify of the agent who has been assigned to taking of the further action. One or more actionable buttons (not shown) may be displayed on the GUI 112. For example, a selectable button may be provided which when pressed using an input device (a mouse), an action may be executed. For example, pressing of the button may place a call to a customer, open an email application and the like. The actionable buttons may be used by the agent 104 or a supervisor to fulfil a promise.

The FCR board 308 may include a list of agents and for each agent performance metrices may be displayed. The list may be sorted so that an agent having best performance metrices for a particular period of time may be displayed on the top of the list, for example, AGENT 1.

Figure 5:
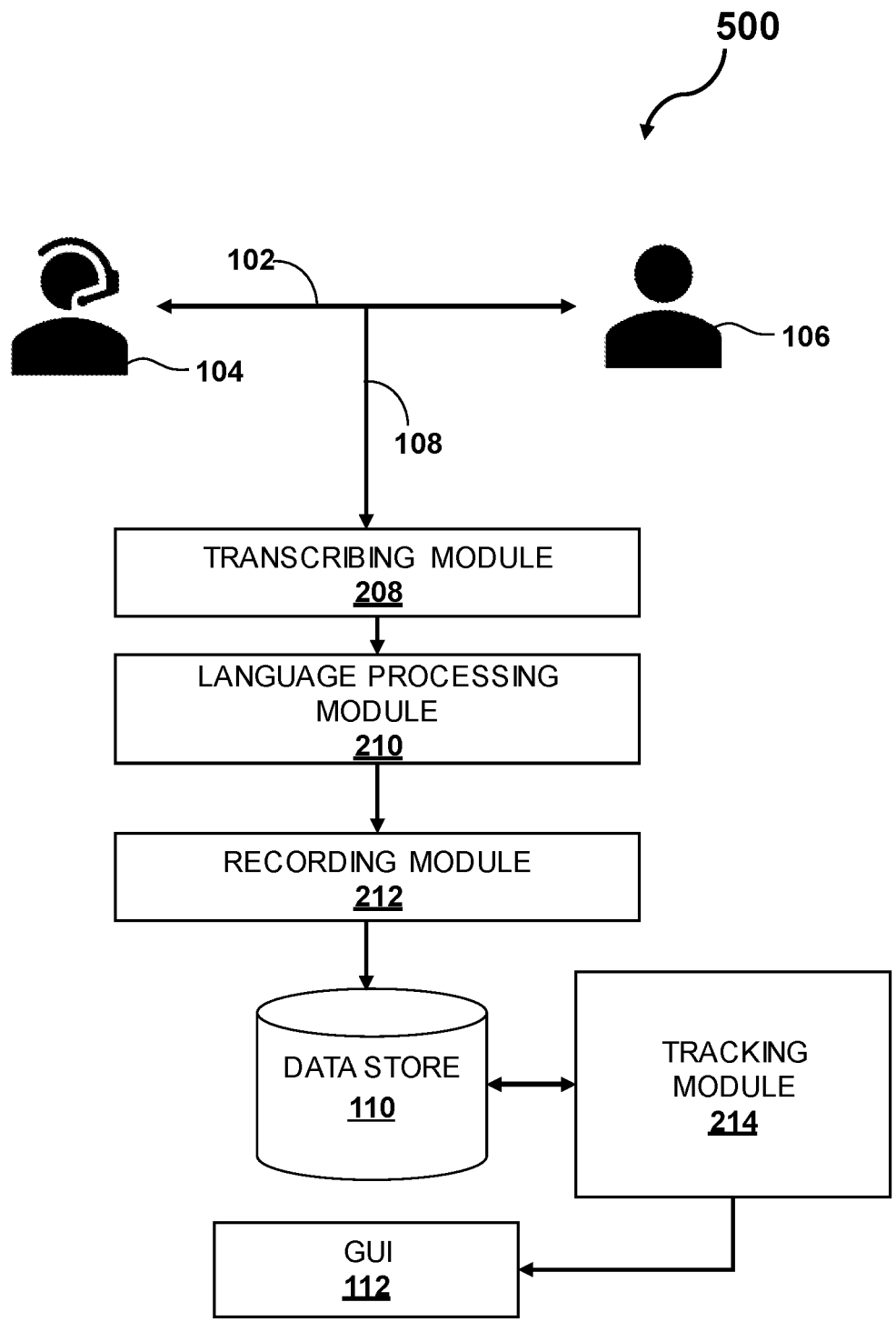
FIG. 5 depicts data flow diagram of promise management method, in accordance with an embodiment of the present invention.

FIG. 5 depicts is a data flow diagram 500 in the promise management apparatus 100 and as per promise management method 300. The audio data 108 from the live call 102 between the agent 104 and the caller 106 is received by the transcribing module 208. The transcribing module 208 generates a transcript from the audio data 108. The transcript may include text data. The text data is provided to the LPM module 210. The LPM module 210 applies language processing techniques to the text data and extracts a promise from the text data. The extracted promise is provided to the recording module 212. The recording module 212 processes the promise and may add one or more parameters (identification information) to the promise, for example, type of promise, a timeline for fulfillment of the promise and identification of agent assigned for fulfillment of the promise. Thus, the recording module 212 generates a promises data. The recording module 212 then stores the promises data in the datastore 110. The tracking module 214 is in bi-directional communication with the datastore 110. The tracking module 214 may retrieves the promises data from the datastore 110 and is configured to add, modify, delete the promises data. The tracking module 214 is also configured to retrieve the promises data from the datastore 110 and present/display the data in a suitable format at the GUI 112.

As described above, the embodiments disclosed herein overcome the shortcomings of the state of the art regarding promise management. The embodiments enable automatic promise extraction and tracking, higher levels of customer satisfaction, and lower customer churn. The techniques described herein overcome the issues associated with conventional system, for example, lack of automatic promise extraction and tracking. The embodiments described herein may be integrated with call logging systems, customer relationship management systems, or knowledge base systems.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations, and datastores are somewhat arbitrary, and particular operations are illustrated in the context of specific illustrative configurations. Finally, structures and functionality presented as discrete components in the example configurations may be implemented as a combined structure or component. These and other variations, modifications, additions, and improvements may fall within the scope of embodiments as described.

While the foregoing is directed to embodiments of the present invention, other and further embodiments of the invention may be devised without departing from the basic scope thereof.

We claim:

1. A method for managing a promises management apparatus, the method comprising:
    automatically transcribing, using an automatic speech recognition engine, a call between a caller and an agent, based on real-time call stream of the call, wherein the caller calls the agent for resolution of a concern using the promises management apparatus;
    automatically extracting, using a natural language processing engine, in real-time a promise made by the agent to the caller based on the transcript of the call;
    generating promises data by assigning an agent, a type, a timeline, an action, and a mode of execution to the promise; and
    storing the promises data in a datastore.

2. The method of claim 1, wherein the mode of execution comprises a mode of communication employed to communicate with the caller, a rank of an agent assigned to communicate with the caller, and a place of origin of the communication to the caller.

3. The method of claim 1 further comprising:
    retrieving the promises data from the datastore; and
    displaying the promises data in a graphical user interface (GUI).

4. The method of claim 3, wherein displaying the promise data in the GUI comprises displaying in one or more fields of the GUI:
    a status for a day;
    a first call resolution (FCR) board;
    a list of one or more promises; and
    a status of the one or more promises.

5. The method of claim 4, wherein the FCR board comprises one or more performance metrices of the agent.

6. The method of claim 5, wherein the one or more performance metrices comprise a customer satisfaction (CSAT) score, an FCR score, a repeat call score, and a customer churn score.

7. The method of claim 6, wherein the one or more performance metrices of an agent are sent to a supervisor of the agent.

8. The method of claim 4, wherein the status of a promise comprises an action taken towards fulfilment of a promise, a further action necessary to fulfil the promise, a timeline for taking of the further action, and identification of an agent assigned to take the further action.

9. The method of claim 1 further comprising;
    generating a report for a quality manager or a supervisor of the agent based on promises data stored in the datastore; and
    sending the report to the quality manager or the supervisor.

10. A promises management apparatus comprising: at least one processor; and
    a memory communicably coupled to the processor, the memory comprising computer-executable instructions, which when executed using the at least one processor, implements a method comprising:
  automatically transcribing, using an automatic speech recognition engine, a call between a caller and an agent, based on real-time call stream of the call, wherein the caller calls the agent for resolution of a concern using the promises management apparatus;
  automatically extracting, using a natural language processing engine, in real-time a promise made by the agent to the caller based on the transcript of the call;
  generating promise data by assigning an agent, a type, a timeline, an action, and a mode of execution to the promise; and
  storing the promise data in a datastore.

11. The apparatus of claim 10, wherein the mode of execution comprises a mode of communication employed to communicate with the caller, a rank of an agent assigned to communicate with the caller, and a place of origin of the communication to the caller.

12. The apparatus of claim 10 further comprising:
  retrieving the promises data from the datastore; and
  displaying the promises data in a graphical user interface (GUI).

13. The apparatus of claim 12, wherein displaying the promise data in the GUI comprises displaying in one or more fields of the GUI:
  a status for a day;
  a first call resolution (FCR) board;
  a list of one or more promises; and
  a status of the one or more promises.

14. The apparatus of claim 13, wherein the FCR board comprises one or more performance metrices of the agent, wherein the one or more performance metrices comprise a customer satisfaction (CSAT) score, an FCR score, a repeat call score, and a customer churn score, and wherein the one or more performance metrices of an agent are sent to a supervisor of the agent.

15. The apparatus of claim 13, wherein the status of a promise comprises an action taken towards fulfilment of a promise, a further action necessary to fulfil the promise, a timeline for taking of the further action, and identification of an agent assigned to take the further action.

16. The apparatus of claim 10, further comprising;
  generating a report for a quality manager or a supervisor of the agent based on promises data stored in the datastore; and
  sending the report to the quality manager or the supervisor.

17. The apparatus of claim 10, wherein the automatically transcribing is performed in real-time.

18. The apparatus of claim 10, wherein the generating promises data is performed in real-time.

19. The method of claim 1, wherein the automatically transcribing is performed in real-time.

20. The method of claim 1, wherein the generating promises data is performed in real-time.

* * * * *